US009097587B2

(12) United States Patent
Furuta (10) Patent No.: US 9,097,587 B2
(45) Date of Patent: Aug. 4, 2015

(54) IMAGE FORMING APPARATUS FOR FORMING A MEASUREMENT IMAGE (71) Applicant: CANON KABUSHIKI KAISHA, Tokyo (JP)

(72) Inventor: Yasutomo Furuta, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 14 days.

(21) Appl. No.: 13/969,306

(22) Filed: Aug. 16, 2013

(65) Prior Publication Data

US 2014/0050496 A1 Feb. 20, 2014

(30) Foreign Application Priority Data

Aug. 20, 2012 (JP) ................. 2012-181547

(51) Int. Cl.
G03G 15/00 (2006.01)
G01J 3/46 (2006.01)
G01J 3/50 (2006.01)
G01J 3/52 (2006.01)
G01J 3/02 (2006.01)

(52) U.S. Cl.
CPC .. *G01J 3/46* (2013.01); *G01J 3/027* (2013.01); *G01J 3/0232* (2013.01); *G01J 3/502* (2013.01); *G01J 3/524* (2013.01); *G03G 15/5062* (2013.01); *G03G 15/55* (2013.01)

(58) Field of Classification Search
CPC ................ G03G 15/5062; G03G 2215/00067; G01J 3/524
USPC .......................................... 399/49
See application file for complete search history.

(56) References Cited

U.S. PATENT DOCUMENTS

| 5,995,775 | A  | * | 11/1999 | Budnik et al. .................. 399/31 |
| 7,036,737 | B2 | * | 5/2006 | Nakayama et al. ...... 235/462.25 |
| 7,499,158 | B2 | * | 3/2009 | Flemming et al. ......... 356/243.4 |
| 8,004,680 | B2 | * | 8/2011 | Martinez ....................... 356/402 |
| 8,144,365 | B2 | * | 3/2012 | Kita et al. ..................... 358/1.9 |
| 8,149,405 | B2 | * | 4/2012 | DiCarlo et al. ............... 356/402 |
| 8,320,023 | B2 | * | 11/2012 | Takahashi et al. ............. 358/3.1 |
| 2012/0106987 | A1 | * | 5/2012 | Furusawa et al. .............. 399/15 |
| 2013/0004188 | A1 | * | 1/2013 | Suzuki ........................... 399/39 |

FOREIGN PATENT DOCUMENTS

JP 03134678 A * 6/1991
JP 2004-086013 A 3/2004

* cited by examiner

Primary Examiner — Clayton E Laballe
Assistant Examiner — Leon W Rhodes, Jr.
(74) Attorney, Agent, or Firm — Canon USA Inc. IP Division

(57) ABSTRACT

An image forming apparatus includes an image forming unit configured to form a measurement image on a sheet, a measurement unit configured to radiate light on the measurement image via a transparent window, and measure the light reflected from the measurement image, a white reference plate of which a white level is measured by the measurement unit, a black member of which a black level is measured by the measurement unit, and a determination unit configured to determine, based on a change in a measurement result of the white reference plate and a change in a measurement result of the black member measured by the measurement unit, whether the white reference plate, the black member, or the window is soiled.

17 Claims, 10 Drawing Sheets

IMAGE FORMING APPARATUS FOR FORMING A MEASUREMENT IMAGE

BACKGROUND OF THE INVENTION

1. Field of the Invention

The present disclosure generally relates to image forming and, more particularly, to an image forming apparatus having a function of measuring colors of a measurement image.

2. Description of the Related Art

Image quality of an image forming apparatus includes granularity, in-plane uniformity, text quality, and color reproducibility (including color stability). In recent years in which a multi-color image forming apparatus has become widely used, the color reproducibility in some cases is the most significant image quality.

Humans have a memory of expected colors (in particular, of a human skin, blue sky, and metal) based on experience, and if a color exceeds an allowable range of such expected color, a viewer develops a feeling of strangeness. Such color is referred to as a memory color, and reproducibility of the memory color has become a concern when outputting a photograph.

Further, increasing demand for color reproducibility (including image stability) with respect to the image forming apparatus is not limited to the photographic image. In the case of a document image, there is an increasing demand from office users who feel discomfort in a color difference between the output from the image forming apparatus and that on a monitor, and from graphic artists who pursue color reproducibility of a computer graphics (CG) image.

To satisfy such user demands for color reproducibility, Japanese Patent Application Laid-Open No. 2004-086013 discusses an image forming apparatus which reads, using a measurement unit (i.e., a color sensor) disposed in a conveyance path of a sheet, the measurement image (i.e., a patch image) formed on the sheet. Such an image forming apparatus feeds back into process conditions such as an exposure amount and a developing bias, a result obtained by the color sensor reading the patch image. Constant density, gradation, and tint can thus be reproduced.

However, color detection accuracy of the color sensor discussed in Japanese Patent Application Laid-Open No. 2004-086013 becomes degraded by an output fluctuation of a light source due to a change in environmental temperature. To solve such a problem, a white reference plate may be arranged opposite to the color sensor, so that the color sensor measures the white reference plate and corrects a detection value of the color sensor.

However, if there is soiling of a window portion of the color sensor or the white reference plate, scattered light from the soiled portion causes an error in the measurement result. In such a case, it becomes necessary to notify service personnel to remove the soiling. However, if the soiled portion cannot be identified, the service personnel may clean or replace an unsoiled component. As a result, working hours of the service personnel may become long, and running cost may increase due to replacement of the component.

SUMMARY OF THE INVENTION

The present disclosure is directed to preventing an error from occurring in the measurement result of the measurement unit, and the increases in the working hours of the service personnel and the running cost due to replacement of the component.

According to an aspect of the present disclosure, an image forming apparatus includes an image forming unit configured to form a measurement image on a sheet, a measurement unit configured to radiate light on the measurement image via a transparent window, and measure the light reflected from the measurement image, a white reference plate of which a white level is measured by the measurement unit, a black member of which a black level is measured by the measurement unit, and a determination unit configured to determine, based on a change in a measurement result of the white reference plate and a change in a measurement result of the black member measured by the measurement unit, whether the white reference plate, the black member, or the window is soiled.

Further features and aspects of the present disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles of the disclosure.

DESCRIPTION OF THE EMBODIMENTS

Various exemplary embodiments, features, and aspects of the disclosure will be described in detail below with reference to the drawings.

(The Image Forming Apparatus)

As an exemplary embodiment of the present disclosure, means for solving the above-described problem will be described below employing an electrophotographic laser beam printer. The electrophotographic method is an example of an image forming method, and an inkjet method and a sublimation method are also applicable to the present disclosure. When the inkjet method is employed, an image forming unit which discharges ink and forms the image on the sheet, and a fixing unit (i.e., a drying unit) for drying the ink, are used.

Figure 1:
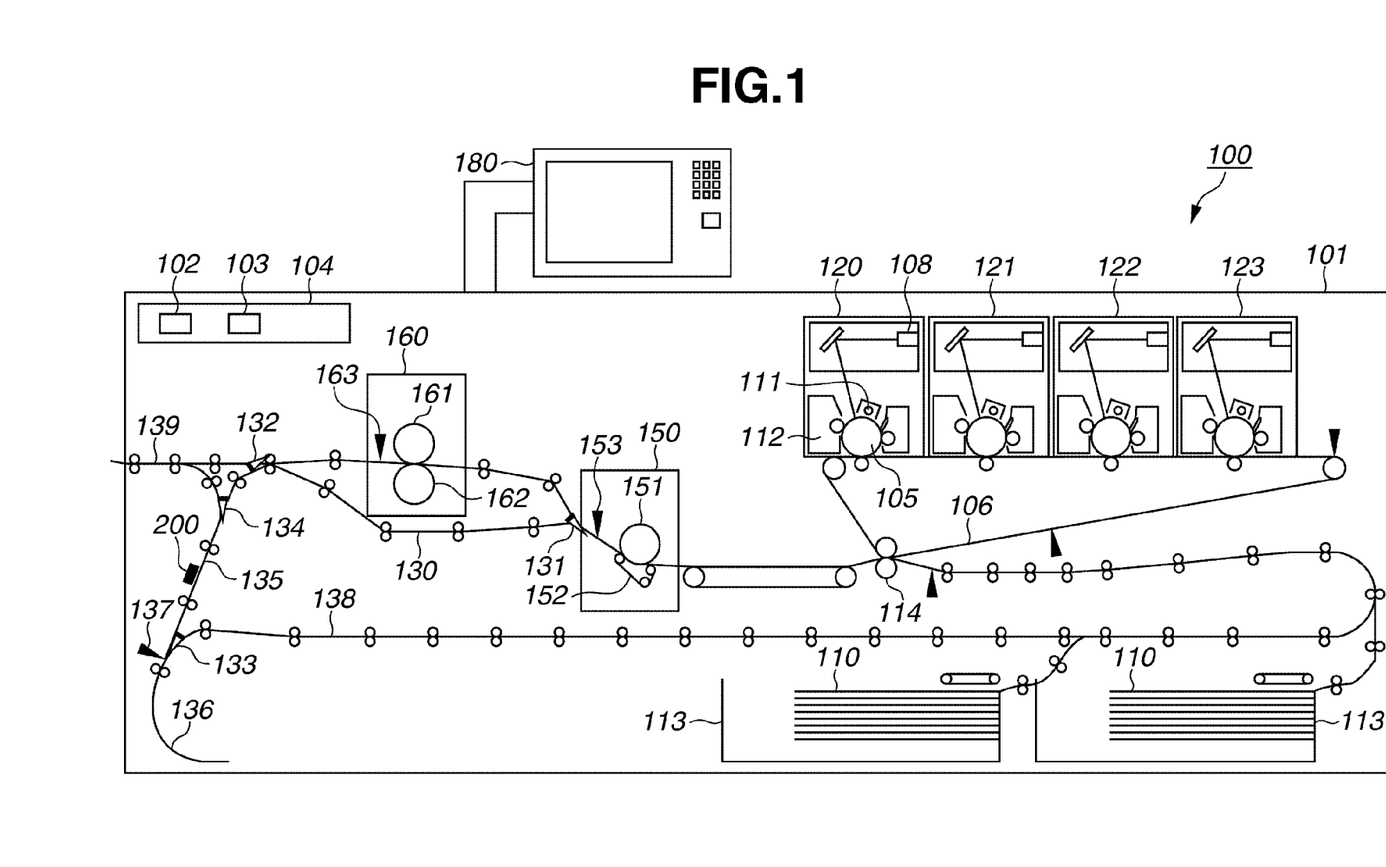
FIG. 1 is a cross-sectional view illustrating a structure of an image forming apparatus.

FIG. 1 is a cross-sectional view illustrating the structure of an image forming apparatus 100. Referring to FIG. 1, the image forming apparatus 100 includes a housing 101 in which mechanisms for configuring an engine unit, and a control board storage unit 104, are disposed. The control board storage unit 104 stores an engine control unit 102 which controls print processing (e.g., paper feeding) performed by each mechanism, and a printer controller 103.

The engine unit includes four stations 120, 121, 122, and 123, corresponding to yellow (Y), magenta (M), cyan (C), and black (K) as illustrated in FIG. 1. The stations 120, 121, 122, and 123 are the image forming units which transfer toner to a sheet 110 and forms the image, and are configured by almost common parts. A photosensitive drum 105 is an image bearing member, and a primary charging device 111 charges a surface of the photosensitive drum 105 to be at a uniform potential. A laser 108 emits a laser beam and forms a latent image on the photosensitive drum 105. A developing device 112 uses the color materials (i.e., the toner) to develop the latent image, and thus forms a toner image. The toner image (i.e., a visible image) is then transferred to an intermediate transfer member 106. A transfer roller 114 transfers the visible image formed on the intermediate transfer member 106 to the sheet 110 conveyed from a storage unit 113.

According to the present exemplary embodiment, a fixing mechanism includes a first fixing unit 150 and a second fixing unit 160 which heat and press the toner image transferred to the sheet 110 and thus fix the toner image on the sheet 110. The first fixing unit 150 includes a fixing roller 151 for applying heat to the sheet 110, a pressing belt 152 for press-contacting the sheet 110 to the fixing roller 151, and a first fixing sensor 153 for detecting whether fixing is completed. The fixing roller 151 is a hollow roller and includes a heater therein.

The second fixing unit 160 is disposed downstream in a conveyance direction of the sheet 110 from the first fixing unit 150. The second fixing unit 160 applies gloss to the toner image on the sheet fixed by the first fixing unit 150, and secures fixability. The second fixing unit 160 includes a fixing roller 161, a pressing roller 162, and a second fixing sensor 163 similarly as the first fixing unit 150. It may become unnecessary to pass the sheet 110 through the second fixing unit 160, depending on the type of the sheet 110. In such a case, the sheet 110 passes through a conveyance path 130 without passing through the second fixing unit 160 to reduce energy consumption.

For example, if a setting is made to apply a large amount of gloss to the toner image on the sheet 110, or a large amount of heat is necessary for fixing the toner image on a cardboard, the sheet passing through the first fixing unit 150 is conveyed to the second fixing unit 160. On the other hand, if the sheet 110 is plain paper or thin paper, and application of a large amount of gloss is not set, the sheet 110 is conveyed on the conveyance path 130 which bypasses the second fixing unit 160. A flapper 131 is switched to control whether to convey the sheet 110 to the second fixing unit 160, or convey the sheet 110 bypassing the second fixing unit 160.

A conveyance path switching flapper 132 is a guiding member which guides the sheet 110 to a conveyance path 135 or to a discharge path 139 leading to the outside. A leading edge of the sheet guided to the conveyance path 135 passes through a reversing sensor 137 and is conveyed to the reversing unit 136. When the reversing sensor 137 detects a trailing edge of the sheet 110, the conveyance direction of the sheet 110 is switched. A conveyance path switching flapper 133 is a guiding member which guides the sheet 110 to a conveyance path 138 for forming the images on two sides of the sheet 110, or the conveyance path 135.

A color sensor 200 for detecting the measurement image (hereinafter referred to as the patch image) on the sheet 110 is arranged in the conveyance path 135. Four sensors 200*a*, 200*b*, 200*c*, and 200*d* (illustrated in FIG. 5) in the color sensor 200 are aligned in the direction perpendicular to the conveyance direction of the sheet 110, so that the color sensor 200 is capable of detecting 4 columns of patch images. If the user instructs color detection from an operation unit 180, the engine control unit 102 performs density control, gradation control, and multi-layered color control. The engine control unit 102 measures the density of a single-color measurement image in performing the density adjustment and the gradation adjustment, and measures the color of the measurement image in which a plurality of colors are superimposed, in performing the multi-layered color adjustment.

A conveyance path switching flapper 134 is a guiding member which guides the sheet 110 to the discharge path 139 leading to the outside. The sheet conveyed to the discharge path 139 is discharged to the outside of the image forming apparatus 100.

(The Color Sensor)

Figure 2:
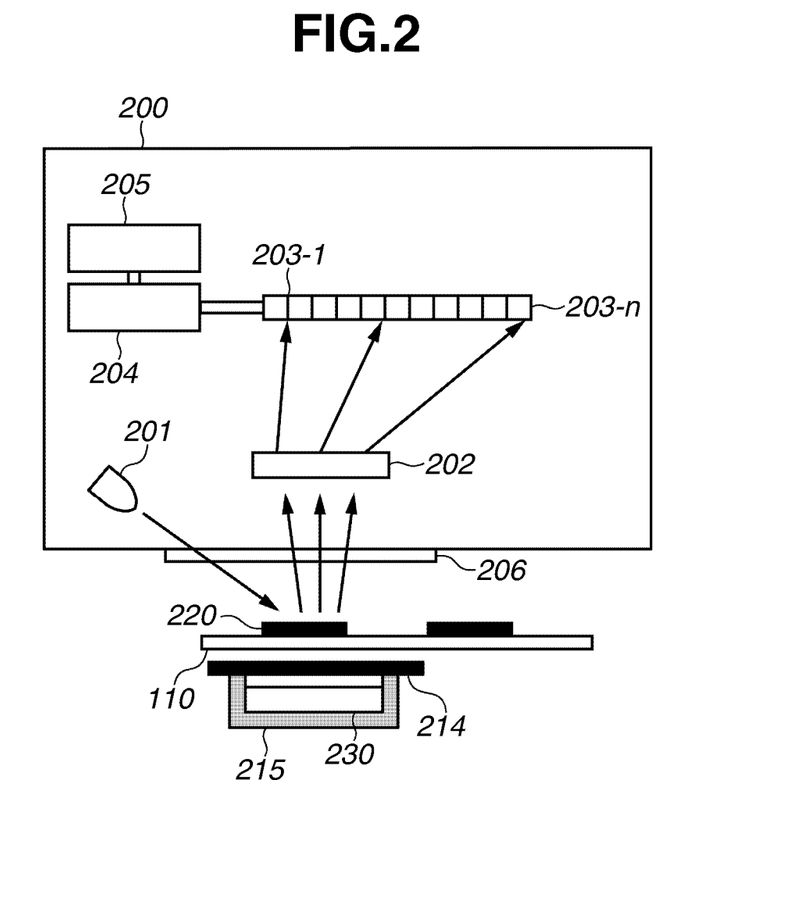
FIG. 2 illustrates a structure of a color sensor.

FIG. 2 illustrates the configuration of the color sensor 200. Referring to FIG. 2, the color sensor 200 includes a white light-emitting diode (LED) 201, a diffraction grating 202, a line sensor 203, a calculation unit 204, and a memory 205. The white LED 201 is a light-emitting element which irradiates with light a patch image 220 on the sheet 110. The light reflected by the patch image 220 passes through a window 206 configured of a transparent member.

The diffraction grating 202 separates the light reflected from the patch image 220 into respective wavelengths. The line sensor 203 is a light detecting element including n light-receiving elements that detect the light separated into the respective wavelengths by the diffraction grating 202. The calculation unit 204 performs various calculations using a light intensity value of each pixel detected by the line sensor 203.

A memory 205 stores various data used by the calculation unit 204. For example, the calculation unit 204 includes a spectral calculation unit which calculates spectral reflectivity from the light intensity value. Further, a lens which focuses the light emitted from the white LED 201 on the patch image 220 on the sheet 110, or focuses the light reflected from the patch image 220 on the diffraction grating 202 may be disposed.

A white reference plate 230 is a member read by the color sensor 200 when performing white correction. The white reference plate 230 is held by a holding member 215. The white reference plate 230 is positioned so that a relative distance with respect to the color sensor 200 becomes fixed by press-contacting the holding member 215 against a metal plate (not illustrated).

It is desirable that the white reference plate 230 has high light resistance and strength to reduce aging degradation. An example of a material of the white reference plate 230 is ceramic-processed aluminum oxide. A shutter 214 is a member which prevents discoloring of the white reference plate 230 caused by exposure to light, and soiling of the white reference plate 230.

Figure 3:
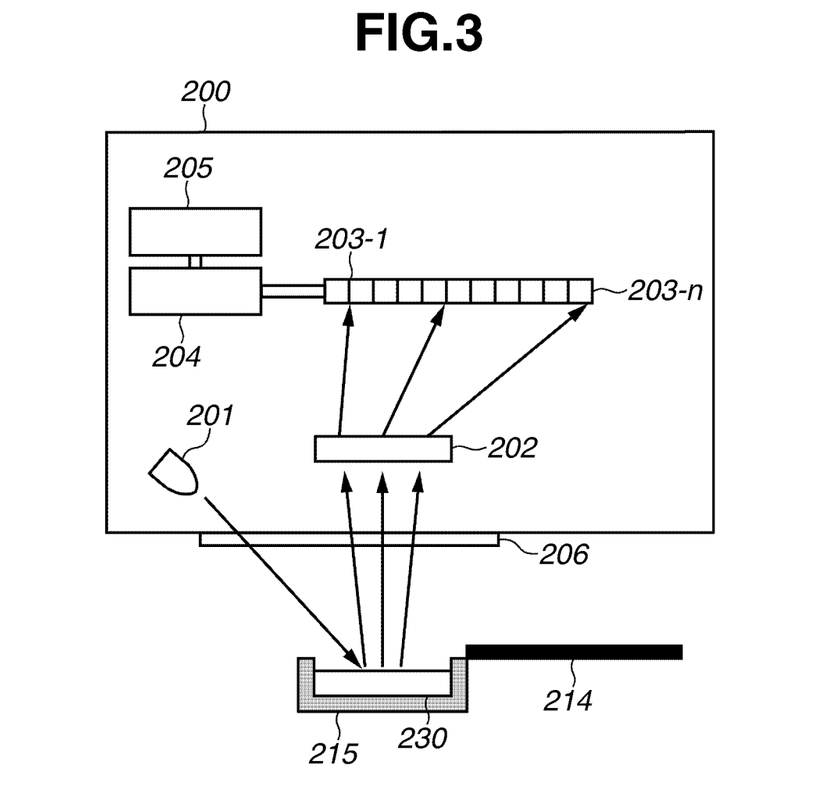
FIG. 3 illustrates a structure of the color sensor.

More specifically, when the color sensor 200 receives the reflected light from the white reference plate 230 and measures a white level, the shutter 214 moves and exposes a surface of the white reference plate 230 as illustrated in FIG. 3.

Figure 4:
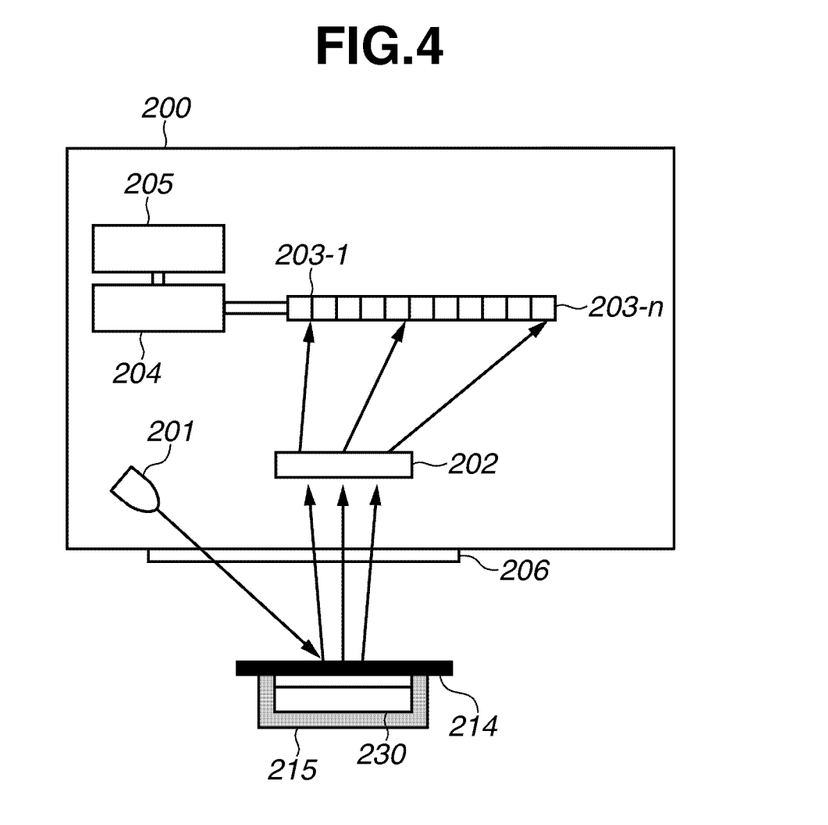
FIG. 4 illustrates a structure of the color sensor.

Further, when the color sensor 200 is not measuring the white level, the white reference plate 230 is protected by the shutter 214 as illustrated in FIG. 4. According to the present exemplary embodiment, the shutter 214 is a black member, so that when the color sensor 200 detects the surface of the shutter 214, black level measurement is performed. The white correction and black level correction will be described in detail below.

(Profile)

When the image forming apparatus 100 performs multi-layered color correction, the image forming apparatus 100 generates an International Color Consortium (ICC) profile to be described below, from the detection result of the patch image including multi-layered colors. The image forming apparatus 100 then uses the profile to convert an input image, and forms an output image.

Figure 5:
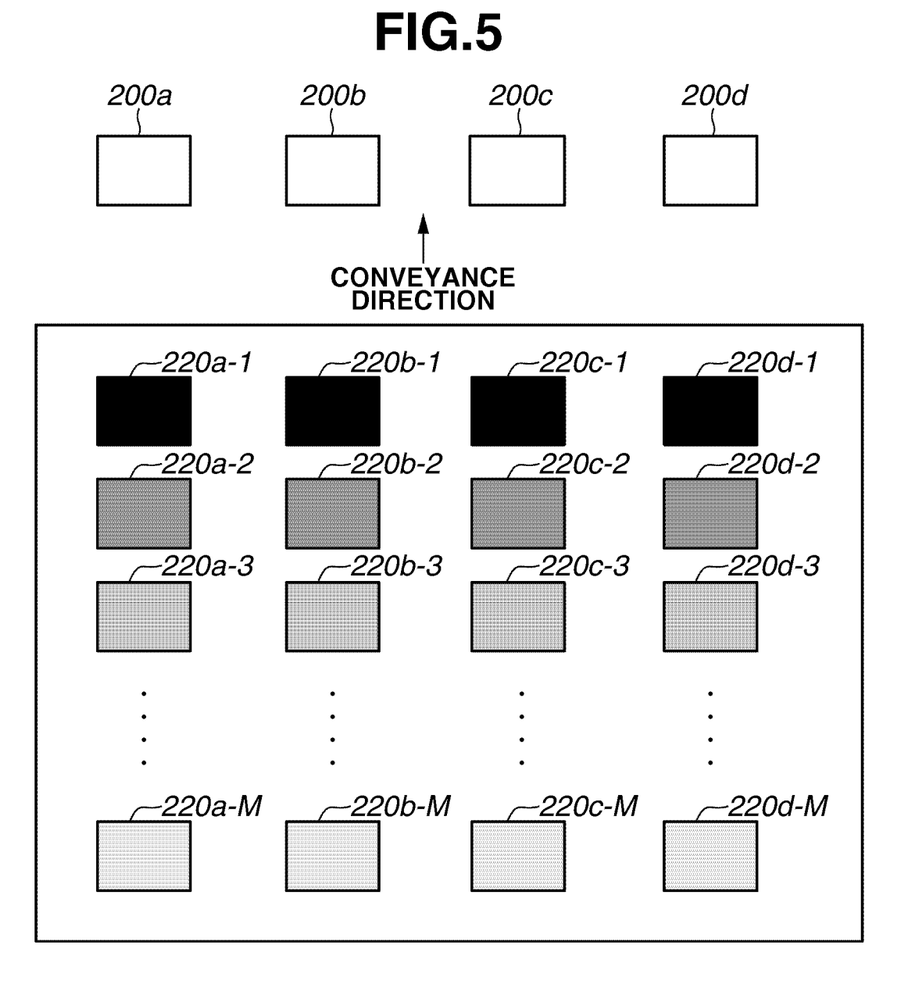
FIG. 5 illustrates an image of a color measurement chart.

Referring to FIG. 5, a dot area ratio of the patch image 220 including multi-layered colors is changed in three levels (i.e., 0%, 50%, and 100%) for each of the four CMYK colors. The patch images of all combinations of the dot area ratios for each color are thus generated. As illustrated in FIG. 5, the patch images 220 (i.e., patch images 220a-1, 220b-1, 220c-1, 220d-1, . . . 220a-M, 220b-M, 220c-M, and 220d-M) are arranged in four columns to be read by each of the color sensors 200a, 200b, 200c, and 200d.

The ICC profile which is recently being accepted in the market is used as the profile which realizes excellent color reproducibility. However, the present disclosure is not limited to the ICC profile, and may be applicable to Color Rendering Dictionary (CRD) employed since PostScript level 2 and a color conversion table in Photoshop (registered trademark), advocated by Adobe Corporation.

When a customer engineer replaces a component, or when a job which requires color matching accuracy is to be executed, or when the user desires to know the tint of an output product in a design planning stage, the user operates the operation unit 180 and instructs generation of the color profile.

Figure 6:
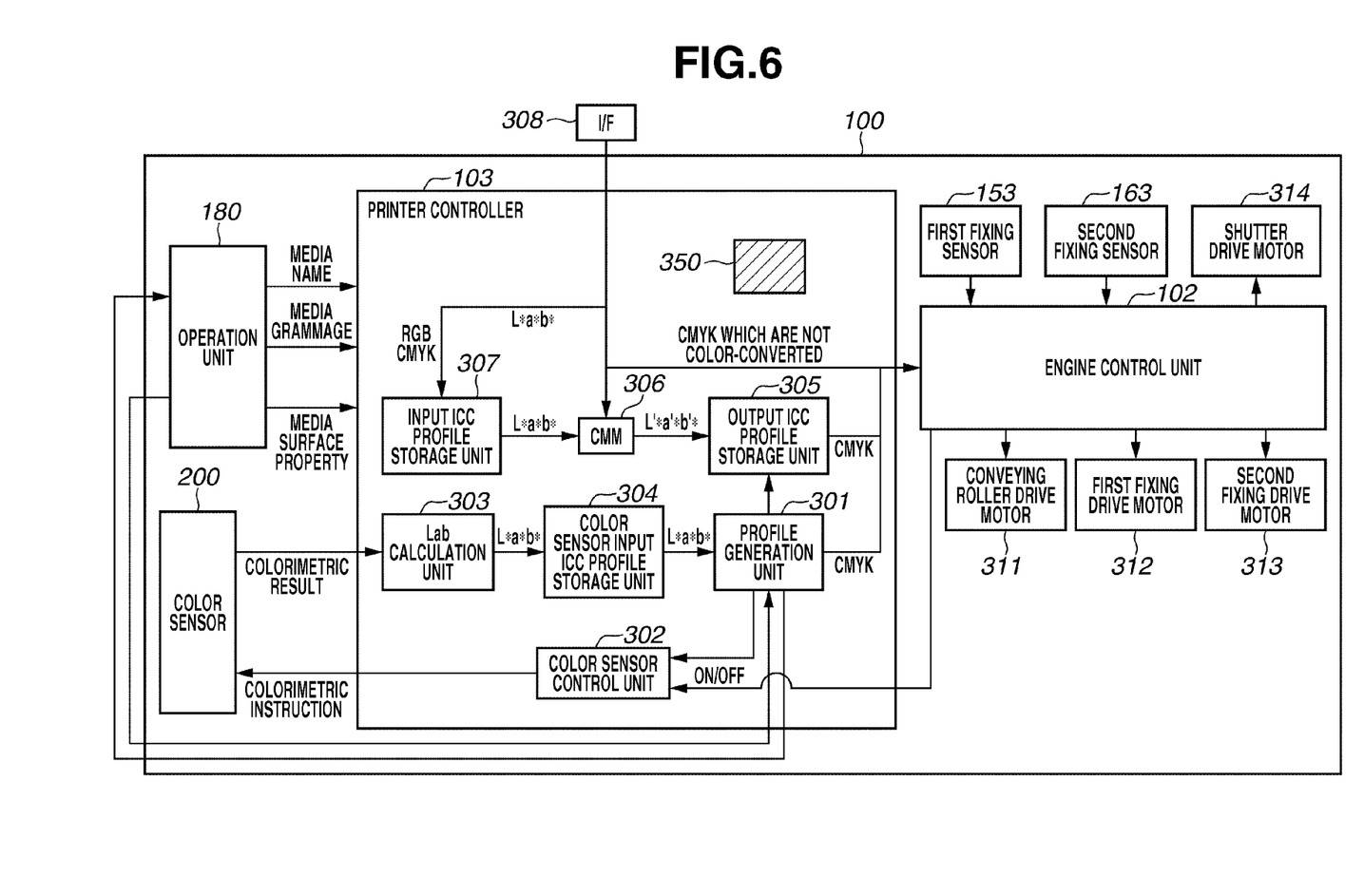
FIG. 6 is a block diagram illustrating a system configuration of the image forming apparatus.

The profile generation process is performed by the printer controller 103 illustrated in the block diagram of FIG. 6. Referring to FIG. 6, the printer controller 103 which includes a central processing unit (CPU) reads from a storage unit 350 and executes a program for executing the flowcharts described below. The inside of the printer controller 103 is expressed by blocks for ease of understanding the processes to be performed by the printer controller 103.

When the operation unit 180 receives the instruction to generate the profile, a profile generation unit 301 outputs to the engine control unit 102, a CMYK color chart 210, i.e., an International Organization for Standardization (ISO) 126402 test form, without using the profile. The profile generation unit 301 then transmits a measurement instruction to a color sensor control unit 302. The engine control unit 102 controls the image forming apparatus 100 to execute the processes such as charging, exposing, developing, transferring, and fixing. As a result, the ISO126402 test form is formed on the sheet 110. The color sensor control unit 302 then controls the color sensor 200 to measure the ISO126402 test form. The color sensor 200 outputs to a Lab calculation unit 303 in the printer controller 103, spectral reflectivity data which is the measurement result. The Lab calculation unit 303 converts the spectral reflectivity data to color value data (i.e., L*a*b* data), and outputs the converted data to the profile generation unit 301. In this case, the L*a*b* data output from the Lab calculation unit 303 is converted using a input ICC profile for color sensor stored in a color sensor input ICC profile storage unit 304. The Lab calculation unit 303 may convert the spectral reflectivity data to Commission Internationale de l' Eclairage (CIE) 1931XYZ color system, i.e., a color space signal independent of a device.

The profile generation unit 301 generates an output ICC profile from a relationship between a CMYK color signal output to the engine control unit 102 and the L*a*b* data input from the Lab calculation unit 303. The profile generation unit 301 then stores in an output ICC profile storage unit 305 the generated output ICC profile.

The ISO12642 test form includes the patches of the CMYK color signals which cover an entire color reproduction gamut that can be output by a general copying machine. As a result, the profile generation unit 301 generates a color conversion table from the relationship between each of the color signal values and the measured L*a*b* values. The profile generation unit 301 thus generates the CMYK-to-Lab conversion table. A reverse conversion table is then generated based on the conversion table.

Upon receiving from a host computer via an interface (I/F) 308 a profile generation command, the profile generation unit 301 outputs to the host computer via the I/F 308 the generated output ICC profile. The host computer can perform color conversion corresponding to the ICC profile, by carrying out an application program.

A first fixing drive motor 312 drives the first driving unit 150, and a second fixing drive motor 313 drives the second fixing unit 160. The engine control unit 102 controls the first fixing drive motor 312 and the second fixing drive motor 313. Further, the engine control unit 102 controls a shutter drive motor 314 which moves the shutter 214.

(Color Conversion)

When the color conversion process is performed for a normal color output, an input image signal is transmitted to an input ICC profile storage unit 307 for external input. The input image signal is based on red (R), green (G), and blue (B) signal values input from a scanner unit via the I/F 308, or standard printing CMYK signal values such as JapanColor. The input ICC profile storage unit 307 then performs RGB-to-L*a*b* or CMYK-to-L*a*b* conversion according to the image signal input from the I/F 308. The input ICC profile stored in the input ICC profile storage unit 307 is configured of a plurality of lookup tables (LUT).

More specifically, the LUT includes a one-dimensional LUT which controls a gamma value of the input signal, a multi-layered color LUT referred to as direct mapping, and the one-dimensional LUT which controls the gamma value of the generated converted data. The input image signal is converted from device-dependent color space data to the device-independent L*a*b* data using the above-described LUT.

The image signal converted to L*a*b* coordinates is input to a color management module (CMM) 306. The CMM 306 performs various types of color conversion. For example, the CMM 306 performs gamut conversion which maps a mismatch between a color space read by the scanner unit, i.e., an input device, and an output color reproduction range of the image forming apparatus 100, i.e., an output device. Further, the CMM 306 performs color conversion which adjusts the mismatch between the type of light source used in inputting the data, and the type of light source used when observing an output product (i.e., the mismatch in a color temperature setting).

As described above, the CMM 306 converts the L*a*b* data to L'*a'*b'* data, and outputs the converted data to the output ICC profile storage unit 305. The output ICC profile storage unit 305 stores the profiles generated by performing measurement. The output ICC profile storage unit 305 thus performs color conversion of the L'*a'*b'* data using the newly generated ICC profile, i.e., coverts the data to an output device-dependent CMYK signal, and outputs the CMYK signal to the engine control unit 102.

(White Correction and Black Level Correction)

As illustrated in FIG. 3, the color sensor 200 measures the reflected light from the white reference plate 230 and performs white level measurement. In the white level measurement, the LED 201 irradiates the white reference plate 230 with light, and the line sensor 203 measures a light amount W (λ) for each wavelength region of the light reflected from the white reference plate 230.

Further, as illustrated in FIG. 4, when the black-colored shutter 214 is closed, the color sensor 200 performs black level measurement. In the black level measurement, the LED 201 irradiates the shutter 214 with light, and the line sensor 203 measures a light amount K (λ) for each wavelength region of the light reflected from the shutter 214.

Furthermore, as illustrated in FIG. 2, the color sensor 200 measures the patch image 220. More specifically, the shutter 214 moves to a position covering the white reference plate 230, and the sheet on which the patch image 220 is formed passes between the color sensor 200 and the shutter 214. The line sensor 203 then measures a light amount P (λ) for each wavelength region of the light reflected from the patch image 220.

The calculation unit 204 obtains spectral reflectivity R (λ) of the patch images 220, based on W (λ), K (λ), and P (λ) measured by the color sensor 200, using equation 1 as follows.

$$R(\lambda) = \{P(\lambda) - K(\lambda)\} / \{W(\lambda) - K(\lambda)\} \quad \text{(equation 1)}$$

(A Method for Measuring the Color Measurement Chart)

Figure 7:
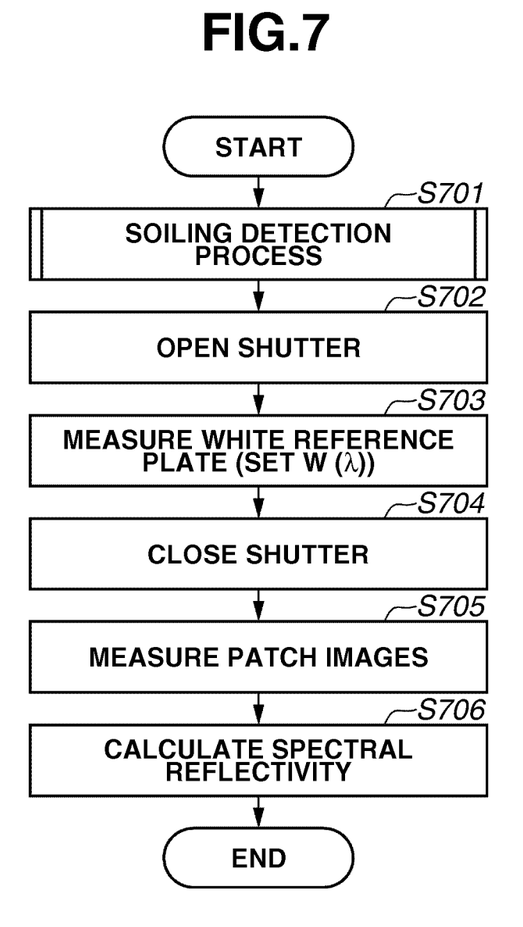
FIG. 7 is a flowchart illustrating the color measurement chart measuring process.

FIG. 7 is a flowchart illustrating the color measurement chart measuring process.

The process of the flowchart illustrated in FIG. 7 is executed by the printer controller 103. The engine control unit 102 controls the image forming apparatus 100 according to an instruction from the printer controller 103.

When the user or an operator operating the operation unit 180 instructs to start measurement of the color measurement chart, the process of the flowchart illustrated in FIG. 7 is executed. In step S701, the printer controller 103 performs soiling detection described below with reference to FIG. 8. In step S702, after completing soiling detection, the printer controller 103 instructs the engine control unit 102 to drive the shutter drive motor 314 and open the shutter 214. In step S703, the printer controller 103 uses the color sensor 200 and performs measurement of the white reference plate 230. The measurement value is stored in the storage unit 350 as W (λ).

In step S704, the printer controller 103 instructs the engine control unit 102 to drive the shutter drive motor 314 and close the shutter 214. In step S705, the printer controller 103 uses the color sensor 200 to perform measurement of the sheet 110 (i.e., the color measurement chart) on which the patch images 220 have been formed. The measurement value is then stored in the storage unit 350 as P (λ).

In step S706, the printer controller 103 calculates the spectral reflectivity of the patch images 220. The spectral reflectivity R (λ) is obtained using the equation 1 described above. A black level correction value, i.e., an initial value of the measurement value K (λ) of the shutter 214, is set to 0. If the window 206 of the color sensor 200 is soiled, K (λ) for performing black level correction is set. Such a process will be described in detail in step S812 illustrated in FIG. 8.

Figure 8:
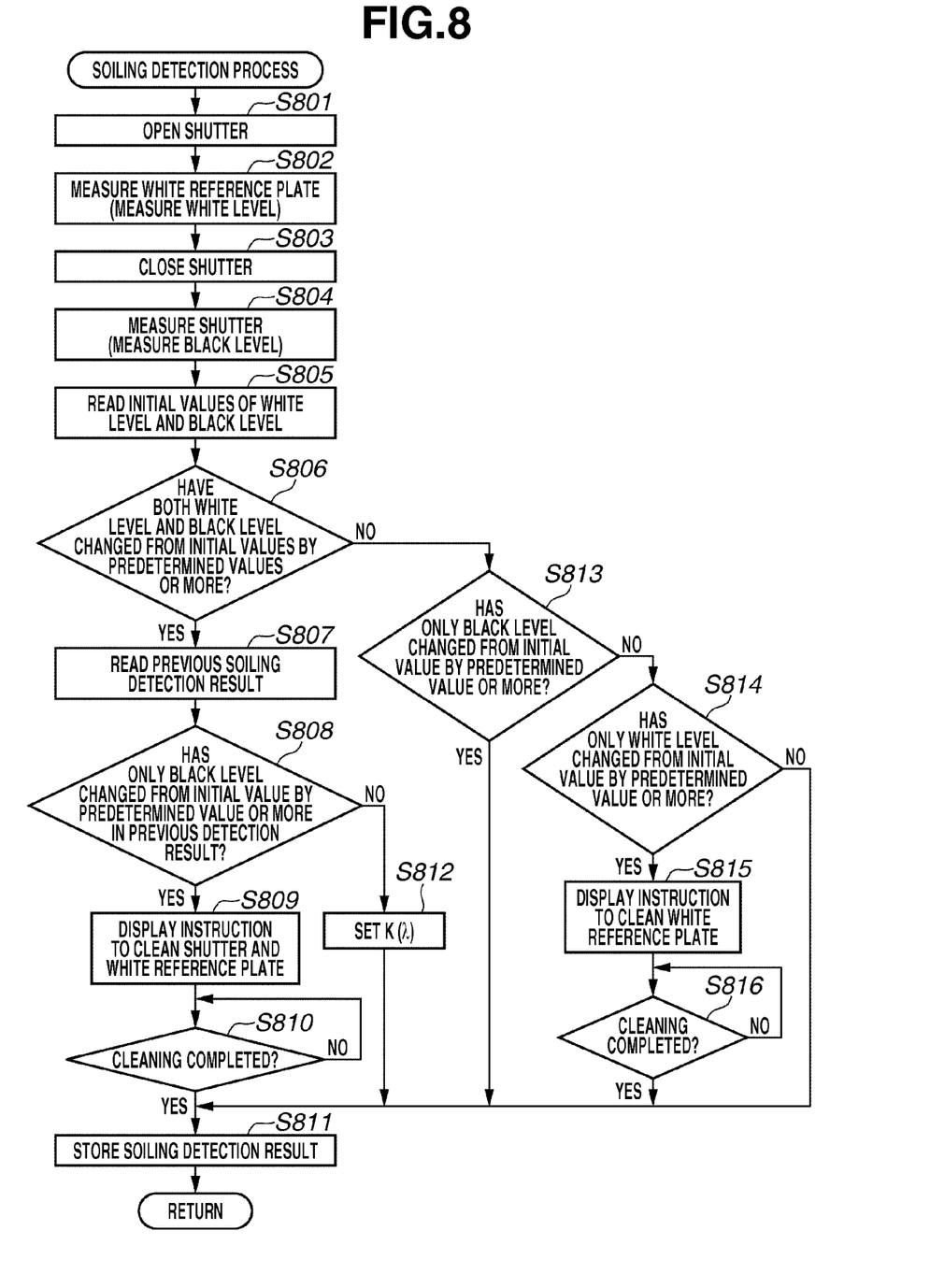
FIG. 8 is a flowchart illustrating a soiling detection process.

FIG. 8 is a flowchart illustrating the soiling detection process performed in step S701 illustrated in FIG. 7.

The process of the flowchart illustrated in FIG. 8 is executed by the printer controller 103. The engine control unit 102 controls the image forming apparatus 100 according to the instruction from the printer controller 103.

In step S801, the printer controller 103 instructs the engine control unit 102 to drive the shutter drive motor 314 and open the shutter 214. In step S802, the printer controller 103 uses the color sensor 200 and performs white level measurement of the white reference plate 230. In step S803, the printer controller 103 instructs the engine control unit 102 to drive the shutter drive motor 314 and close the shutter 214. In step S804, the printer controller 103 uses the color sensor 200 to perform black level measurement of the shutter 214.

In step S805, the printer controller 103 reads from the storage unit 350 the initial values of the white level and the black level. In step S806, the printer controller 103 determines whether both the white level measured in step S802 and the black level measured in step S804 have changed from the initial values read in step S805 by at least predetermined values.

If both the white level and the black level have changed from the initial values by at least predetermined values (YES in step S806), the process proceeds to step S807. In step S807, the printer controller 103 reads from the storage unit 350 the previous soiling detection result. In step S808, the printer controller 103 determines whether only the black level has changed from the initial value by at least a predetermined value in the previous measurement.

If only the black level has changed from the initial value by at least a predetermined value in the previous measurement (YES in step S808), it indicates that the soiling of the shutter 214 has been detected in the previous measurement, so that the white reference plate 230 has been newly soiled in the present measurement. The process then proceeds to step S809. In step S809, the printer controller 103 displays on a display of the operation unit 180, the instruction to clean the shutter 214 and the white reference plate 230.

In step S810, the printer controller 103 stands by until the user or the operator cleans the shutter 214 and the white reference plate 230. Whether the cleaning has ended is determined based on the user or the operator input from the operation unit 180. In step S811, after the cleaning has been completed, the printer controller 103 stores in the storage unit 350 the soiling detection result, and the process proceeds to step S702 illustrated in FIG. 7. The soiling detection result is the detection result indicating whether each of the black level and the white level has changed from the initial value by at least a predetermined value.

On the other hand, if it is not determined that only the black level has changed from the initial value by at least a predetermined value in the previous measurement (NO in step S808), it indicates that the window 206 is soiled in the present measurement. The process then proceeds to step S812. In step S812, the printer controller 103 sets the measurement value of the shutter 214 obtained in step S804 as K (λ) to be used when calculating the spectral reflectivity in step S706 illustrated in FIG. 7. The process then proceeds to step S811. If the window 206 is soiled, it is necessary to set W (λ) in addition to K (λ). However, W (λ) is set in step S703 described above.

If it is not determined that both the white level and the black level have changed from the initial values by at least a predetermined value (NO in step S806), the process proceeds to step S813. In step S813, the printer controller 103 determines whether only the black level has changed from the initial value by at least a predetermined value.

If only the black level has changed from the initial value by at least a predetermined value (YES in step S813), it indicates that the shutter 214 is soiled. The process then proceeds to step S811 without instructing cleaning of the shutter 214 even when the shutter 214 is soiled. The reason for instructing no cleaning will be described below.

If the black level has not changed from the initial value by at least a predetermined value (NO in step S813), the process proceeds to step S814. In step S814, the printer controller 103 determines whether only the white level has changed from the initial value by at least a predetermined value. If only the white level has changed from the initial value by at least a predetermined value (YES in step S814), it indicates that the white reference plate 230 is soiled. In such a case, the process proceeds to step S815. In step S815, the printer controller 103 displays on the display of the operation unit 180 the instruction to clean the white reference plate 230.

In step S810, the printer controller 103 stands by until the user or the operator cleans the shutter 214 and the white reference plate 230. Whether the cleaning has been completed is determined based on the user or the operator input from the operation unit 180. After cleaning has been completed, the process proceeds to step S811.

If the white level has not changed from the initial value by at least a predetermined value (NO in step S814), it indicates that none of the window 206, the shutter 214, and the white reference plate 230 is soiled. In such a case, printer controller 103 does not issue the cleaning instruction, and the process proceeds to step S811.

In step S806, step S808, step S813, and step S814, the printer controller 103 determines whether the white level and the black level have changed from the initial values by at least predetermined values. The initial values may be the values that have been actually measured, or values previously set in the storage unit 350. In other words, the initial value may be any value as long as it is a prescribed value indicating a certain standard.

By the above-described series of processes, the soiled portion is determined, and the process according to the soiled portion is performed. The relation between the soiled portion and the variation in the level of output from the line sensor 203 will be described below.

Figure 9A:
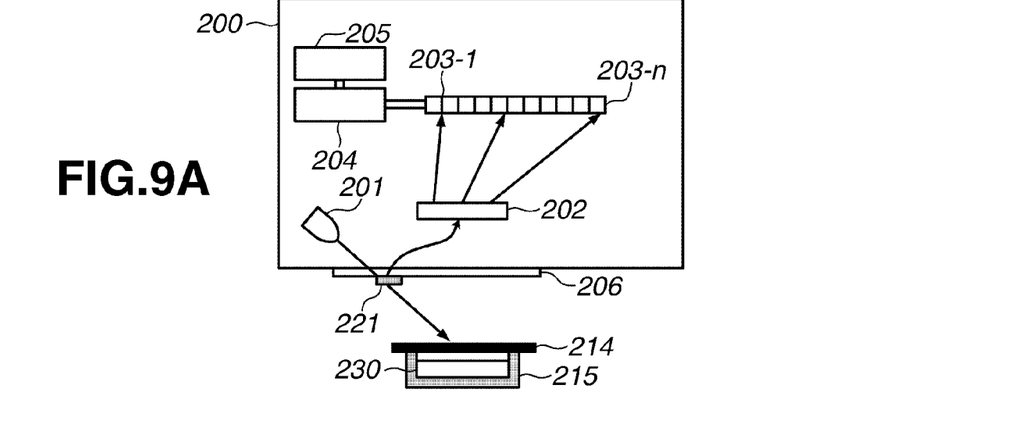
FIG. 9A illustrates a state in which the window of the color sensor is soiled.
Figure 10A:
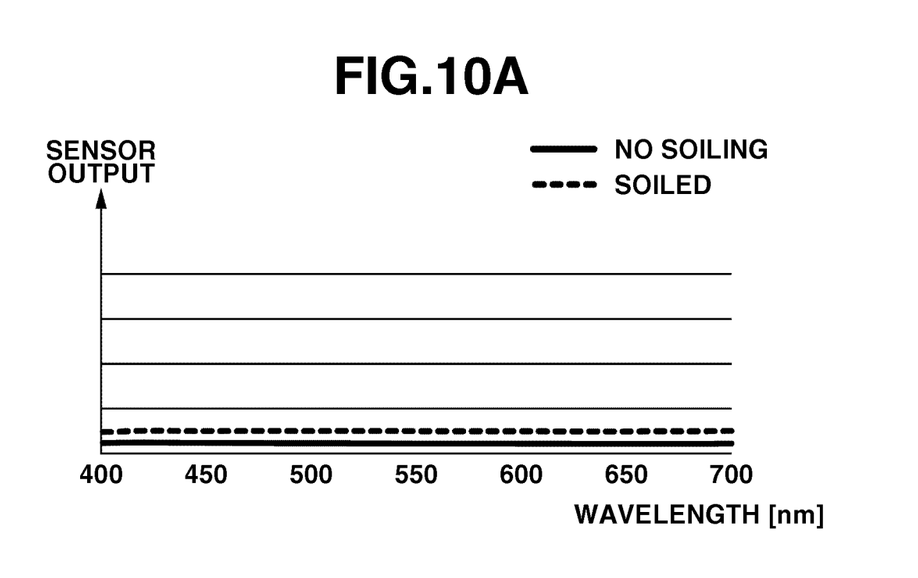
FIGS. 10A and 10B illustrate a change in the color sensor output due to the soiling.
Figure 10B:
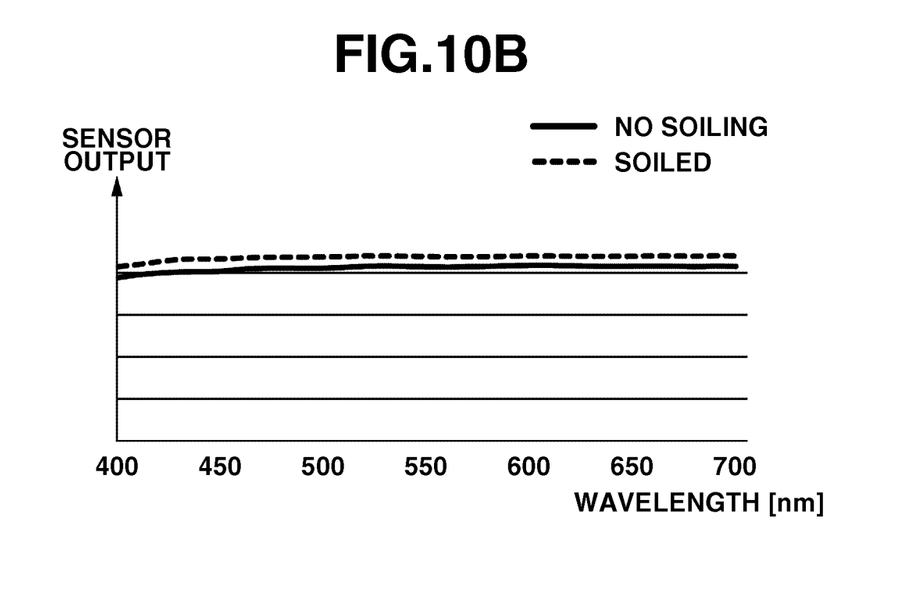

Referring to FIG. 9A, if the window 206 is soiled, the line sensor 203 detects a scattered light component from the soiled portion. As a result, as illustrated in FIG. 10A, the light is detected even when the shutter 214 is closed. Further, if the measurement of the white reference plate 230 is performed, the scattered light component from the soiled portion is added, so that the output level rises as illustrated in FIG. 10B. As a result, if the window 206 is soiled, the output level from the line sensor 203 changes in both the black level measurement and the white level measurement. When the window 206 is soiled as described above, the above-described K (λ) for performing black level correction and W (λ) for performing white level correction are set, so that the error caused by the scattered light component can be cancelled.

Figure 9B:
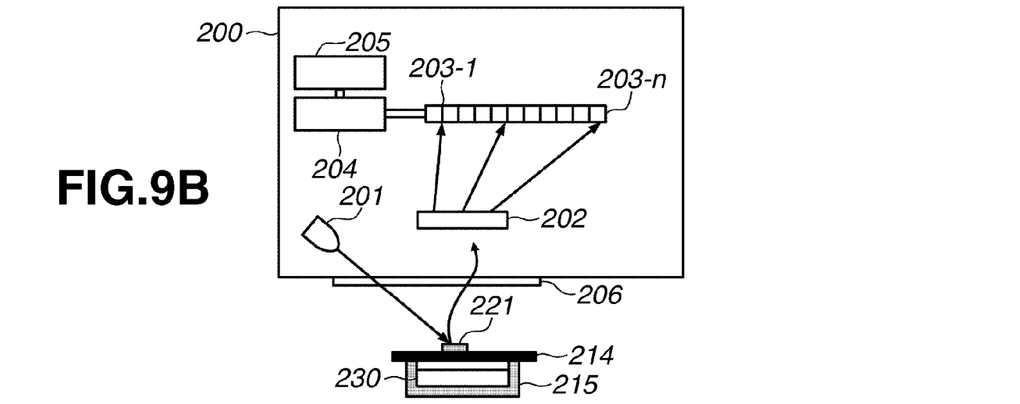
FIG. 9B illustrates a state in which a shutter is soiled.
Figure 9C:
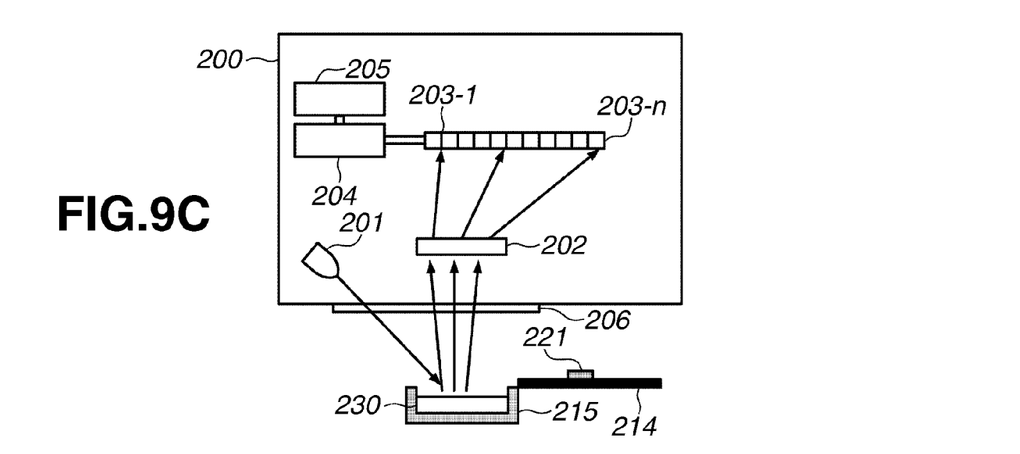
FIG. 9C illustrates a state in which the soiled shutter is open.

FIGS. 9B and 9C illustrate a case where the shutter 214 is soiled. If the shutter 214 is soiled, the output level changes when measuring the black level as illustrated in FIG. 9B. However, the output level does not change when measuring the white level as illustrated in FIG. 9C. As a result, the soling of the window 206 and the soling of the shutter 214 can be distinguished by confirming whether the output level has changed when measuring the white reference plate 230.

Since the soiling of the shutter 214 does not have an adverse effect on the measurement accuracy as long as the black level correction is not performed, it is not particularly necessary to deal with the soiling. On the other hand, if the output level changes only when measuring the white reference plate 230, it can be determined that the white reference plate 230 is soiled. When the white reference plate 230 is soiled, it is difficult to cancel the effect of the soiled portion by performing correction, and it becomes necessary to perform cleaning when the amount of soiling is large.

If the output level of the white reference plate 30 has changed while the shutter 214 has been previously soiled (i.e., only the black level is changing), it is likely that the shutter 214 and the white reference plate 230 are soiled, so that it is preferable to clean each component.

As described above, according to the present exemplary embodiment, the occurrence of the error in the measurement result of the color sensor 200 is prevented, and the increases in the working hours of the service personnel and the running cost due to replacement of the component are prevented.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims priority of Japanese Patent Application No. 2012-181547 filed Aug. 20, 2012, which is hereby incorporated by reference herein in its entirety.

What is claimed is:

1. An image forming apparatus comprising:
    an image forming unit configured to form a measurement image on a sheet;
    a measurement unit configured to radiate light on the measurement image via a transparent window, and measure the light reflected from the measurement image;
    a white reference plate of which a white level is measured by the measurement unit;
    a black member of which a black level is measured by the measurement unit;
    a calculation unit configured to calculate spectral reflectivity of the measurement image by correcting a measurement result of the measurement image measured by the measurement unit, based on the white level and the black level; and
    a determination unit configured to determine, based on a change in a measurement result of the white reference plate and a change in a measurement result of the black member measured by the measurement unit, whether the white reference plate, the black member, or the transparent window is dirty,
    wherein the determination unit determines that the transparent window is dirty, in a case where it has not been determined that the black member is dirty in a previous determination result, and a measurement result of the white reference plate measured by the measurement unit has changed from a prescribed value by at least a predetermined value, and a measurement result of the black member has changed from an initial value of the measurement result by at least a predetermined value.

2. The image forming apparatus according to claim 1, wherein the determination unit determines that the black member is dirty, in a case where the measurement result of the white reference plate measured by the measurement unit has not changed from the prescribed value by at least the predetermined value, and the measurement result of the black member has changed from a prescribed value by at least a predetermined value.

3. The image forming apparatus according to claim 2, wherein the measurement unit is not configured to measure the black member in a case where the determination unit determines that the black member is dirty.

4. The image forming apparatus according to claim 1, wherein the determination unit determines that the white reference plate is dirty, in a case where the measurement result of the white reference plate measured by the measurement unit has changed from the prescribed value by at least the predetermined value, and the measurement result of the black member has not changed from the prescribed value by at least the predetermined value.

5. The image forming apparatus according to claim 4, wherein a cleaning instruction is issued in a case where the determination unit determines that the white reference plate is dirty.

6. The image forming apparatus according to claim 4, wherein an instruction to clean both the black member and the white reference plate are issued in a case where the determination unit determines that both the black member and the white reference plate are dirty.

7. The image forming apparatus according to claim 1, wherein the measurement unit is configured to measure the black member and the black level is corrected in a case where the determination unit determines that the transparent window is dirty.

8. The image forming apparatus according to claim 1, wherein the determination unit determines that both the black member and the white reference plate are dirty, in a case where it has not been determined that the black member is dirty in the previous determination result, and the measurement result of the white reference plate measured by the measurement unit has changed from an initial value of the measurement result by at least a predetermined value, and the measurement result of the black member has changed from the initial value of the measurement result by at least the predetermined value.

9. The image forming apparatus according to claim 1, further comprising a moving unit configured to move the black member to a position at which the black member covers and protects a surface of the white reference plate, and a position at which the black member exposes the surface of the white reference plate.

10. The image forming apparatus according to claim 9, wherein the moving unit moves, in a case where the measurement unit measures the white reference plate, the black member to the position at which the black member exposes the surface of the white reference plate, and moves, in a case where the measurement unit measures the black member, the black member to the position at which the black member covers and protects the surface of the white reference plate.

11. The image forming apparatus according to claim 1, wherein the measurement unit measures a light amount of the light reflected from the measurement image for each wavelength region.

12. The image forming apparatus according to claim 1, further comprising an obtaining unit configured to obtain lightness and chromaticity data based on the spectral reflectivity calculated by the calculation unit.

13. The image forming apparatus according to claim 12, further comprising a generation unit configured to generate an international color consortium profile based on the lightness and chromaticity data obtained by the obtaining unit.

14. The image forming apparatus according to claim 1, wherein the image forming unit forms a single-color measurement image in a case where density measurement is to be performed, and forms a multi-color measurement image in which a plurality of colors is superimposed in a case where color measurement is to be performed.

15. The image forming apparatus according to claim 1, further comprising a fixing unit configured to fix the measurement image onto a sheet,
   wherein the measurement unit measures the fixed measurement image.

16. The image forming apparatus according to claim 15, wherein the image forming unit transfers the measurement image on an image bearing member to the sheet, and
   wherein the fixing unit heats the measurement image and fixes the measurement image onto the sheet.

17. The image forming apparatus according to claim 15, wherein the image forming unit discharges ink and forms an image on the sheet, and
   wherein the fixing unit dries the ink by heat.

* * * * *